US012737251B2

(12) United States Patent
Pearson et al.

(10) Patent No.: US 12,737,251 B2
(45) Date of Patent: Sep. 15, 2026

(54) MACHINE TO MACHINE CAPABILITY SHARING

(71) Applicant: INTERNATIONAL BUSINESS MACHINES CORPORATION, Armonk, NY (US)

(72) Inventors: Joseph Andrew Pearson, Kennesaw, GA (US); Ashok Kumar Iyengar, Encinitas, CA (US); Troy Fine, Sutter Creek, CA (US); Ryan Anderson, Kensington, CA (US); Nathan Andrew Phelps, Durham, NC (US); Kavitha Bade, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 304 days.

(21) Appl. No.: 18/442,264

(22) Filed: Feb. 15, 2024

(65) Prior Publication Data

US 2025/0265142 A1 Aug. 21, 2025

(51) Int. Cl.
*G06F 11/00* (2006.01)
*G06F 11/07* (2006.01)

(52) U.S. Cl.
CPC ...... *G06F 11/0793* (2013.01); *G06F 11/0709* (2013.01)

(58) Field of Classification Search
CPC ............. G06F 11/0793; G06F 11/0709; G06F 11/0721
See application file for complete search history.

(56) References Cited

U.S. PATENT DOCUMENTS 10,405,215 B2 9/2019 Tavares Coutinho
11,431,561 B2 8/2022 Smith
(Continued)

FOREIGN PATENT DOCUMENTS

WO 2018005011 A1 1/2018

OTHER PUBLICATIONS

Chen et al., “Deep Learning With Edge Computing: A Review,” IEEE, vol. 107, No. 8, Aug. 2019, Proceedings of the IEEE, https://ieeexplore.ieee.org/stamp/stamp.jsp?tp=&arnumber=8763885, pp. 1655-1674.
(Continued)

*Primary Examiner* — Katherine Lin
(74) *Attorney, Agent, or Firm* — Tihon Poltavets

(57) ABSTRACT

Described is a method for utilizing machine to machine communications to facilitate capability sharing includes determining a first machine out of a group of machines has encountered an issue, that cannot be resolved, where the group of machines are connected via a machine to machine (M2M) communication mesh. The method also includes determining a solution to the issue encountered by the first machine while performing an assigned task The method also includes determining, based on structured messages provided by a management hub, a second machine from the group of machines can provide the first solution to the issue encountered by the first machine. The method also includes providing to the first machine a first sharable capability of the second machine, where the first sharable capability resolves the issue encountered by the first machine.

18 Claims, 5 Drawing Sheets

(56) References Cited

U.S. PATENT DOCUMENTS

| | | | | |
|---|---|---|---|---|
| 11,785,466 | B2 | 10/2023 | Smith | |
| 2013/0185408 | A1* | 7/2013 | Ngo | G06F 9/5077 709/223 |
| 2023/0095092 | A1 | 3/2023 | Xiao | |

OTHER PUBLICATIONS

Disclosed Anonymously, "Collaboration of Hybrid Data Centers with Edge Devices," IP.com, IP.com No. IPCOM000264249D, IP.com Publication Date: Nov. 25, 2020, 6 pages.
Disclosed Anonymously, "Method and System for Edge Computing via Dynamic Configuration of Capacity and Contextually-Aware IoT Sensors," IP.com, IP.com No. IPCOM000267921D, IP.com Publication Date: Dec. 6, 2021, 6 pages.
Disclosed Anonymously, "Method and System for Large Language Models with Drone Swarms for Efficient Infrastructure Inspection and Decision Support," IP.com, IP.com No. IPCOM000272263D, IP.com Publication Date: May 10, 2023, 15 pages.
FirstNet, "Empowering America's first responders with FirstNet," https://www.firstnet.com/, Accessed: Nov. 9, 2023, 4 pages.
Khan et al., "Edge Computing: a Survey," Future Generation Computer Systems, Feb. 2019, ResearchGate, DOI: 10.1016/j.future.2019.02.050, 40 pages.
Lewis, "Edge Computing: Use Cases and Challenges," Carnegie Mellon University, Software Engineering Institute, SCSS 2019, https://insights.sei.cmu.edu/documents/4248/2019_017_001_634727.pdf, 17 pages.
Newman, "At Ford factories, Boston Dynamics's robot dog Spot is teaming up with a new robotic friend," Fast Company, Jul. 29, 2020, https://www.fastcompany.com/90533566/at-ford-factories-boston-dynamicss-robot-dog-spot-is-teaming-up-with-a-new-robotic-friend, 15 pages.
Orlando, After Disaster Strikes, a Robot Might Save Your Life, Discover Magazine, Aug. 16, 2020, https://www.discovermagazine.com/technology/after-disaster-strikes-a-robot-might-save-your-life, 25 pages.
Simmie, "Asylon, Boston Dynamics partner on integrated security system," DroneDJ, May 4, 2021, https://dronedj.com/2021/05/04/aslyon-boston-dynamics-partner-on-integrated-security-system/, 5 pages.
Sprecher et al., "Harmonizing standards for edge computing—A synergized architecture leveraging ETSI ISG MEC and 3GPP specifications," ETSI White Paper #36, 1st edition—Jul. 2020, https://www.etsi.org/images/files/ETSIWhitePapers/ETSI_wp36_Harmonizing-standards-for-edge-computing.pdf, 14 pages.
Tesei et al., "Secure Multi-access Edge Computing Assisted Maneuver Control for Autonomous Vehicles," 2021 IEEE 93rd Vehicular Technology Conference (VTC2021-Spring), Apr. 25-28, 2021, IEEE Xplore, https://ieeexplore.ieee.org/document/9449087, 6 pages.
Wikipedia, "Pareto efficiency," Wikipedia—The Free Encyclopedia, Accessed: Nov. 21, 2023, https://en.wikipedia.org/wiki/Pareto_efficiency, 11 pages.
Alsamhi et al., "UAV Computing-Assisted Search and Rescue Mission Framework for Disaster and Harsh Environment Mitigation," Drones 2021, 6, 154., Published: Jun. 22, 2022, https://doi.org/10.3390/drones6070154, 21 pages.

* cited by examiner

MACHINE TO MACHINE CAPABILITY SHARING

BACKGROUND

This disclosure relates generally to machine to machine communications, and in particular to utilize machine to machine communications to facilitate capability sharing.

Path planning for an autonomous machine represents a computational problem to identify a sequence of configurations to move the autonomous machine between an origin location and a destination location to perform an assigned task. Obstacle avoidance is typically incorporated into path planning and represents a component of autonomous navigation and control systems, where an autonomous machine can detect and avoid obstacles while traveling to the desired destination. In a favorable operating environment with a strong network connection between the autonomous machine and a remote server, the autonomous machine can perform an obstacle avoidance maneuver while traveling to the desired location to perform an assigned task or can communicate with the remote server to send a notification for unresolved obstacles along a planned path plan. In an unfavorable operating environment that can include a weak network connection between the autonomous machine and the remote server, the autonomous machine can fail to perform the obstacle avoidance maneuver and can fail to communicate with the remote server to send the notification for the unresolved obstacle along the planned path to complete the assigned task.

SUMMARY

Embodiments in accordance with the present invention disclose a computer-implemented method, a computer program product, and a computer system for utilizing machine to machine communications to facilitate capability sharing, the computer-implemented method, the computer program product, and the computer system determine a first machine out of a plurality of machines has encountered an issue, that cannot be resolved, wherein the plurality of machines are connected via a machine to machine (M2M) communication mesh. The computer-implemented method, the computer program product, and the computer system determine a first solution to the issue encountered by the first machine while performing an assigned task. The computer-implemented method, the computer program product, and the computer system determine, based on a plurality of structured messages provided by a management hub, a second machine from the plurality of machines can provide the first solution to the issue encountered by the first machine. The computer-implemented method, the computer program product, and the computer system provide to the first machine a first sharable capability of the second machine, wherein the first sharable capability resolves the issue encountered by the first machine.

DETAILED DESCRIPTION

Figure 1:
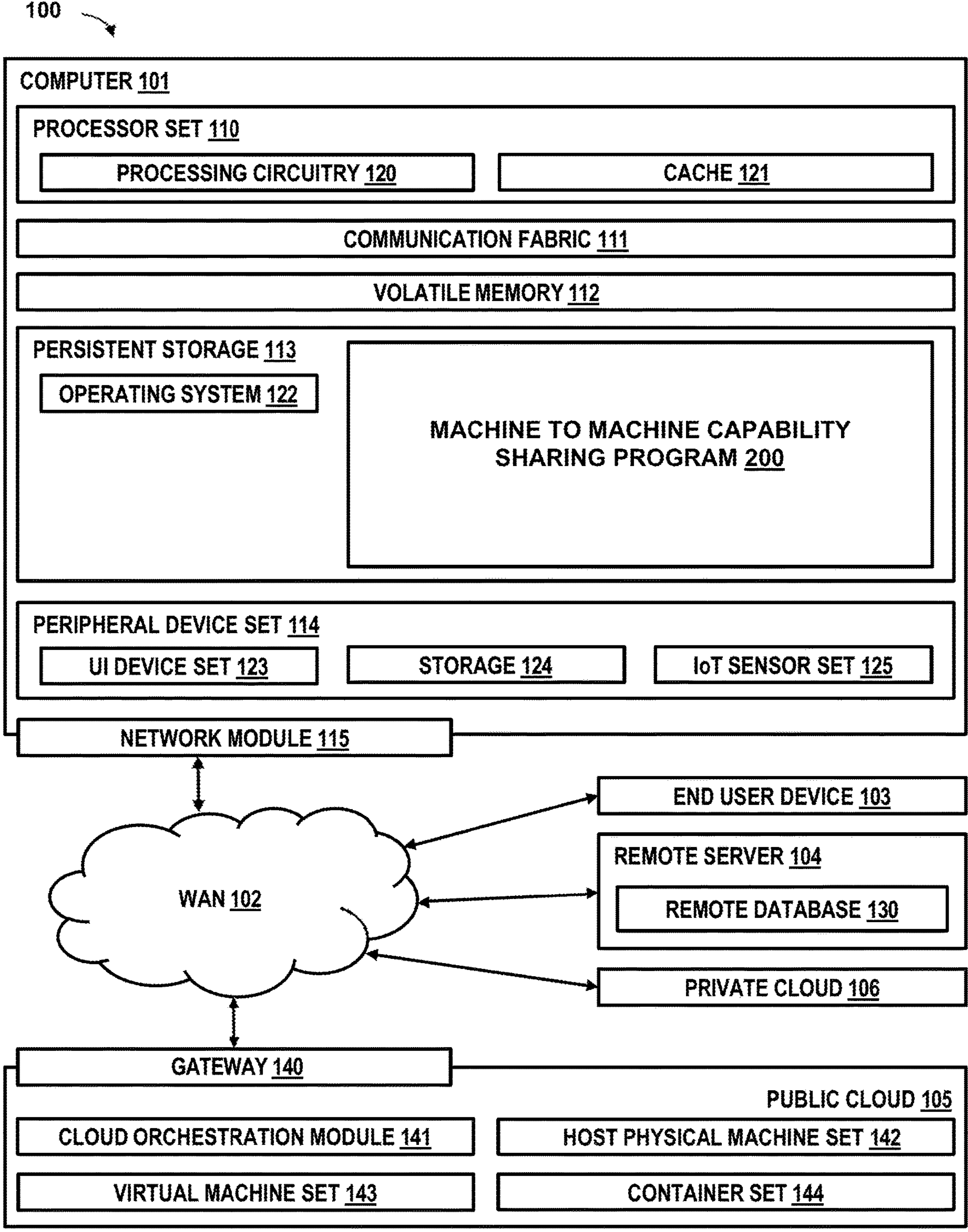
FIG. 1 is a functional block diagram illustrating a computing environment, in accordance with an embodiment of the present invention.

Embodiments of the present invention provide a machine to machine (M2M) dynamic communication mesh for a team of autonomous or semi-autonomous machines to discover capabilities of other team members in the fleet (i.e., mesh) and negotiate to utilize the capabilities without intervention from a management hub. Prior to deployment of the team of autonomous or semi-autonomous machines, the management hub can receive machine information for which embodiments of the present invention can identify sharable capabilities for each machine and register each of the machines. The machine information represents device node proprieties which are utilized to identify known and sharable capabilities. Based on an assigned task to be performed, embodiments of the present invention provide, via the management hub, team information for a group of autonomous or semi-autonomous machines and instructions for joining the team that share a common M2M communication mesh. The management hub allows for the registered machines that are grouped to form the team to query one another for available capabilities across the team and request the available capabilities for temporary usage based on a specified duration. Since the management hub includes a list of the available devices and associated sharable capabilities, the management hub provides the structed messages to allow for one device to negotiate an agreement for the temporary usage of an available capability of another device. The management hub provides a foundation for the group of devices that form the team to determine when a device from the group has encountered an issue (e.g., obstacle), determine a solution for the encountered issue, and determine that another device from the group can provide a solution to the encountered via a sharable capability.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as, machine to machine capability sharing program 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
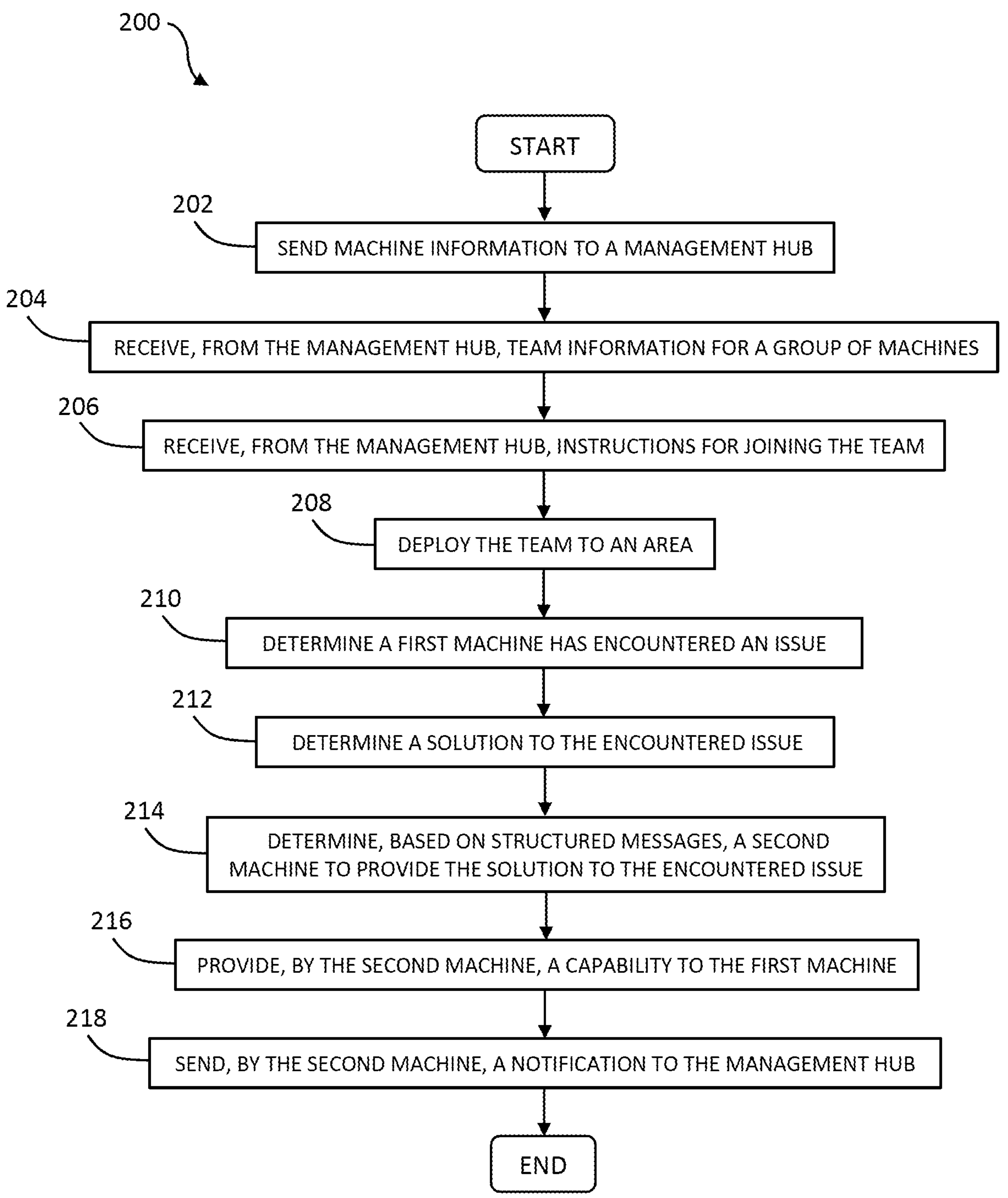
FIG. 2 depicts a flowchart of a machine to machine capability sharing program to facilitate machine capability sharing when a machine encounters an issue, in accordance with an embodiment of the present invention.

FIG. 2 depicts a flowchart of a machine to machine capability sharing program to facilitate machine capability sharing when a machine encounters an issue, in accordance with an embodiment of the present invention.

Machine to machine capability sharing program 200 sends machine information to a management hub (202). Machine to machine capability sharing program 200 utilizes the management hub for registering multiple machines which are to be deployed to an area to perform an assigned task. The multiple machines can include various land, water, and/or aerial based devices capable of completing a task in an autonomous or semi-autonomous manner. The machines utilize a shared mesh radio IP network, such as, Wi-Fi™, LoRa™, and Bluetooth® to communicate with one another to operate in a cooperative manner to perform the assigned task. In this embodiment, machine to machine capability sharing program 200 instructs every available machine to send machine information to the management hub, where the management hub resides in a network base station and one or more local hubs are deployed to one or more teams of the multiple machines. Each of the one or more local hubs can communicate with the management hubs. The machine information sent to the management hub represents node properties for each machine that include known and sharable capabilities, where a first machine can share a capability with a second machine in a group of multiple machines. Machine to machine capability sharing program 200 can parse the node properties (i.e., machine specification) to identify the sharable capabilities for each machine to maximize a potential usability of every machine in the group to provide a solution to an encountered issue while performing the assigned task.

The node properties that machine to machine capability sharing program 200 parses can include but is not limited to an operational distance for the machine (e.g., 2 miles), an operational time for the machine (e.g., two hours), an operational speed (e.g., x<30 mph), an operational altitude (e.g., 10,000 ft.), a payload capacity (e.g., 100 lbs.), an operational environment (e.g., land, water, and/or aerial), an operational drive (e.g., electric motor, 4×4, propeller), an operational accessory (e.g., tracks, all-terrain tires, short or vertical landing), operational sub-devices (e.g., cameras, lidar, sonar, mechanical components), and operational software (e.g., Emotional Intelligence, Artificial Intelligence). Utilizing the node properties, machine to machine capability sharing program 200 identifies sharable capabilities that include but are not limited to, camera imagery, lidar sensor data, mechanical components, and operational movements. Camera imagery includes but is not limited to images, videos, or streams from visual, infrared, and/or low-light cameras. Lidar sensor data includes but is not limited laser based distances measurements for objects and obstacles in a surrounding area of an environment in which the machine is positioned in. Mechanical components include but is not limited mechanical arms with various moving fixtures for grabbing, moving, and/or lifting objects. Operational movements include but is not limited to land, water, and/or aerial based movements for each of the machines.

Machine to machine capability sharing program 200 receives, from the management hub, team information for a group of machines (204). Machine to machine capability sharing program 200, at the management hub, registers each machine for which machine information was received to form a team of a group of machines which are to be deployed to perform the assigned task. The registration of the machines allows for a secure method to exchange structured messages between the group of machines, since each machine knows the other members of the group of machines that form the team.

Machine to machine capability sharing program 200 receives, from the management hub, instructions for joining the team (206). The management hub provides the structured messages for each machine in the group of machines with instructions on how to join the team, along with sharable capabilities for each machine in the group of machines. Instructions for the team can includes a machine (M2M) communication mesh network ID to which each machine from the group of machines that form team can join to communicate with one another while performing the assigned task. Upon each machine joining the team, each team member can communicate over the M2M communication mesh specifically designated for the team.

Machine to machine capability sharing program 200 deploys the team to an area (208). Machine to machine capability sharing program 200 deploys the team by instructing each machine to perform the assigned task via the M2M communication mesh, where each machine operates in an autonomous or semi-autonomous manner to perform one or more activities associated with the assigned task. In one embodiment, machine to machine capability sharing program 200 deploys the team to the area by instructing multiple land based machines to travel from an origin location to a destination location, where an aerial based machine travels in conjunction with the multiple land based machines. The area with the original location and the destination location represents a disaster area impacted by an environmental occurrence, such as, an earthquake or hurricane, where communication with a management hub is unavailable and various obstacles are present between the origin location and the destination location. The assigned task can include removing debris at the destination location to allow for an evacuation aircraft to land.

Machine to machine capability sharing program 200 determines a first machine has encountered an issue (210). The encountered issue represents an instance where the first machine can no longer proceed with performing the assigned task. In one embodiment, the first machine encounters an obstruction, where machine to machine capability sharing program 200 determines the first machine cannot autonomously resolve the encountered issue. Machine to machine capability sharing program 200 can utilize a time threshold for determining when the first machine cannot autonomously resolve the encountered issue. For example, if machine to machine capability sharing program 200 determines the first machine did not move from a specific location (e.g., a 5 ft. radius) between the origin location and the destination location within a pre-determined time (e.g., 3 minutes), machine to machine capability sharing program 200 determines the first machine has encountered an obstruction (i.e., the issue). In another embodiment, the first machine encounters an onboard sensor fault, where machine to machine capability sharing program 200 determines the first machine cannot autonomously resolve the encountered issue. The onboard sensor fault is for an LIDAR sensor that is no longer operational on the first machine and machine to machine capability sharing program 200 determines the first machine requires the LIDAR sensor to safely maneuver between the original location and the destination location to perform the assigned task.

In yet another embodiment, machine to machine capability sharing program 200 determines the first machine has encountered an issue due to a progress for completing the assigned task falling behind schedule. For example, the first machine was assigned to remove debris at the destination location to form a 20 ft. by 20 ft. area to allow for an evacuation aircraft to land. Based on a current time and an estimated time to complete the task, machine to machine capability sharing program 200 determines the first machine has encountered an issue of not being able to remove the debris to form the 20 ft. by 20 ft. area prior to an expected time of arrival for the evacuation aircraft. In yet another embodiment, machine to machine capability sharing program 200 determines the first machine has encountered an issue due to the first machine requiring a sensor that is currently installed on the first machine.

Machine to machine capability sharing program 200 determines a solution to the encountered issue (212). Though machine to machine capability sharing program 200 can determine multiple solutions to the encountered issue by the first machine, machine to machine capability sharing program 200 can select the solution based on energy efficiency (e.g., requiring the least amount of battery energy), time efficiency (e.g., requiring the least amount of time to perform), risk assessment (e.g., potential damage to second machine), and/or resource efficiency (e.g., one machine solution versus two or more machine solution). In the embodiment where the first machine encounters the obstruction and machine to machine capability sharing program 200 determines the first machine cannot autonomously resolve the encountered issue, machine to machine capability sharing program 200 determines a solution includes extending a visual range of the first machine. By extending the visual range of the first machine, machine to machine capability sharing program 200 determines the first machines can potentially resolve the encountered issue caused by the obstruction. Machine to machine capability sharing program 200 determines the visual range can be provided to the first machine via one or more sharable capabilities of one or more other machines in the group of machines that form the team.

In the embodiment where the first machine encounters an onboard sensor fault and machine to machine capability sharing program 200 determines the first machine cannot autonomously resolve the encountered issue, machine to machine capability sharing program 200 determines a solution that includes another machine in the group of machines that form the team to temporary allow the first machine to utilize an onboard sensor on the other machine (i.e., matching sensor type). Machine to machine capability sharing program 200 determines data from the onboard sensor on the other machine can be temporarily provided to the first machine via one or more sharable capabilities of one or more other machines in the group of machines that form the team to complete the assigned task. In the embodiment where machine to machine capability sharing program 200 determines the first machine has encountered an issue due to a progress for completing the assigned task falling behind schedule, machine to machine capability sharing program 200 determines a solution that includes one or more other machines assisting with the completing the task prior to the expected time of arrival for the evacuation aircraft. In the embodiment where machine to machine capability sharing program 200 determines the first machine has encountered an issue due to the first machine requiring a sensor that is currently installed on the first machine, machine to machine capability sharing program 200 determines a solution that includes the first machine sharing the sensor installed on another machine from the group of machines that form the team on an alternating basis.

Machine to machine capability sharing program 200 determines, based on the structured messages, a second machine to provide the solution to the encountered issue (214). Since the management hub provided each of the machines in the group of machines that form the team the sharable capabilities for each machine via the structured messages in (206), machine to machine capability sharing program 200 identifies one or more other machines from the group of machines that form the team that can provided the solution to the encountered issue and identifies the second machine from the one or more other machines as being an optimal machine to provide the solution to the encountered issue. In the embodiment where machine to machine capability sharing program 200 determines the solution includes extending the visual range of the first machine, machine to machine capability sharing program 200 determines the second machine which is an aerial machine can provide the solution of extending the visual range of the first machine. Machine to machine capability sharing program 200 determines an overhead camera view of the area where the first machine has encountered an obstruction can provide a solution to the first machine to navigate around the obstruction.

In the embodiment where machine to machine capability sharing program 200 determines the solution includes another machine in the group of machines that form the team to temporary allow the first machine to utilize an onboard sensor on the other machine, machine to machine capability sharing program 200 determines a second machine is the other machine with the onboard sensor similar to the faulty onboard sensor on the first machine. Therefore, machine to machine capability sharing program 200 determines the first machine can temporarily utilize the onboard sensor of the second machine to assist with performing the assigned task. In embodiment where machine to machine capability sharing program 200 determines a solution that includes one or more other machines assisting with the completing the task prior to the expected time of arrival for the evacuation aircraft, machine to machine capability sharing program 200 determines a second machine can assist the first machine in clearing debris. Machine to machine capability sharing program 200 determines the first machine can clear a 10 ft. by 20 ft. area and the second machine can clear debris from a similar 10 ft. by 20 ft. area, thus halving the estimated time to complete the assigned task. In the embodiment where machine to machine capability sharing program 200 determines the solution that includes the first machine sharing the sensor installed on another machine from the group of machines that form the team on an alternating basis, machine to machine capability sharing program 200 determines a second machine includes the sensor which can be shared on an alternating basis with the first machine.

Machine to machine capability sharing program 200 provides, by the second machine a capability to the first machine (216). Machine to machine capability sharing program 200 provides the capability to first machine by instructing the first machine to assist the first machine with the encountered issue. In the embodiment where machine to machine capability sharing program 200 determines the second machine which is an aerial machine can provide the solution of extending the visual range of the first machine, machine to machine capability sharing program 200 instructs the second machine to relocate to a position over the first machine within a predefined radius surrounding the first machine. The position of the second machine over the first machine allows for a camera on the second machine to provide a view of the area where the first machine has encountered the obstruction. Machine to machine capability sharing program 200 on the first machine utilizes a view from the camera on the second machine to determine an alternate path between the origin location and the destination location avoiding the obstruction. In the embodiment where machine to machine capability sharing program 200 determines a second machine is the other machine with the onboard sensor similar to the faulty onboard sensor on the first machine, machine to machine capability sharing program 200 instructs the second machine to relocate to a position near the first machine within a predefined radius surrounding the first machine. Machine to machine capability sharing program 200 further instructs the second machine to temporarily send sensory data, for a predetermined amount of time, from the similar onboard sensor to the first machine with the faulty onboard sensor and machine to machine capability sharing program 200 operating on the first machine receives the sensory data and utilizes the sensory data from the second device to perform the assigned task.

In embodiment where machine to machine capability sharing program 200 determines the second machine can assist the first machine in clearing debris, machine to machine capability sharing program 200 instructs the second machine to clear debris from a portion of the area adjacent to another portion being cleared by the first machine. Machine to machine capability sharing program 200 provides the clearing capability of the second machine to assist the first machine in clearing the 20 ft. by 20 ft. area at the destination location to allow for the evacuation aircraft to land. For example, machine to machine capability sharing program 200 can instruct the second machine to relocate within a predefined radius surrounding the first machine and the second machine can perform a portion of the assigned task in parallel to another portion of the assigned task being performed by the first machine. machine to machine capability sharing program 200 can integrate a first result from the portion of the assigned task performed by the second machine with a second result from the other portion of the assigned task performed by the first machine. In the embodiment where machine to machine capability sharing program 200 determines a second machine includes the sensor which can be shared on an alternating basis with the first machine, machine to machine capability sharing program 200 determines a schedule for the alternating sharing of the sensor on the second machines and instructs the second machine to send the sensor data to the first device based on the determined schedule.

Machine to machine capability sharing program 200 sends, by the second machine, a notification to the management hub (218). Machine to machine capability sharing program 200 sends the notification to the management hub upon establishing a connection to the management hub, whether it be while the assigned task is being performed or subsequent to completion of the assigned task. Machine to machine capability sharing program 200 sends a summary of the solution that included the sharing of capabilities between the first machine and the second machine, along with issue that the first machine encountered while attempting to perform the assigned task.

Figure 3A:
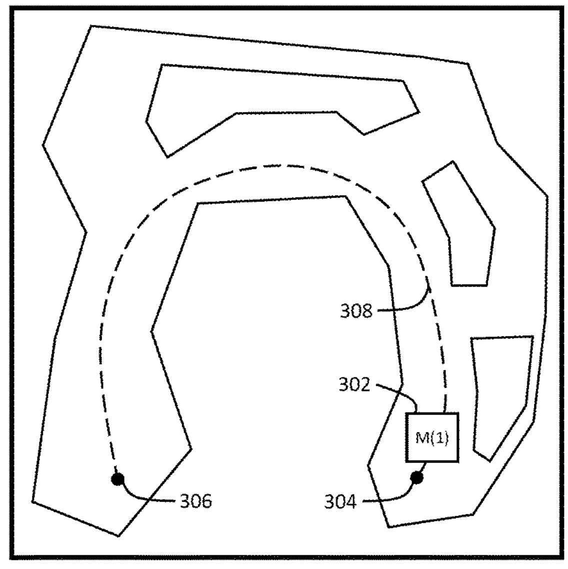
FIG. 3A illustrates an overhead view of a path plan for a first machine between an origin location and a destination location to complete an assigned task, in accordance with an embodiment of the present invention.

FIG. 3A illustrates an overhead view of a path plan for a first machine between an origin location and a destination location to complete an assigned task, in accordance with an embodiment of the present invention. In this example, prior to deploying machine 302, machine to machine capability sharing program 200 sent machine information for machine 302 to a management hub, where the management hub registered machine 302 and any other machine that sent machine information prior to deployment of machine 302. Machine to machine capability sharing program 200 received, from the management hub, team information for a group of machines that includes machine 302 and multiple other machines. Along with the team information, machine to machine capability sharing program 200 received, from the management hub, instructs for machine 302 to join the team that shared an M2M communication mesh. Subsequent to establishing the group of machines that formed the team that includes machine 302, machine to machine capability sharing program 200 deployed machine 302 to travel from origin location 304 to destination location 306 along planned path 308 to perform an assigned task.

Figure 3B:
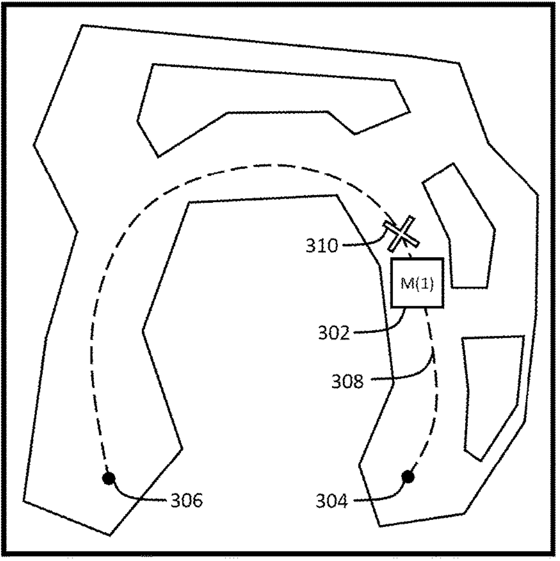
FIG. 3B illustrates an overhead view of a path plan for a first machine between an origin location and a destination that encounters an unresolved obstacle, in accordance with an embodiment of the present invention.

FIG. 3B illustrates an overhead view of a path plan for a first machine between an origin location and a destination that encounters an unresolved obstacle, in accordance with an embodiment of the present invention. In this example, while machine 302 travels along planned path 308, machine 302 encounters obstacle 310 between origin location 304 and destination location 306. Machine to machine capability sharing program 200 determines machine 302 has encountered an issue and determines machine 302 cannot autonomously resolve the encountered issue. Machine to machine capability sharing program 200 utilizes a time threshold of 3 minutes to determine that machine 302 cannot autonomously resolve the encountered issue of maneuvering around obstacle 310. Machine 302 cannot maneuver around obstacle 310 due to an obstructed view from the surrounding terrain.

Figure 3C:
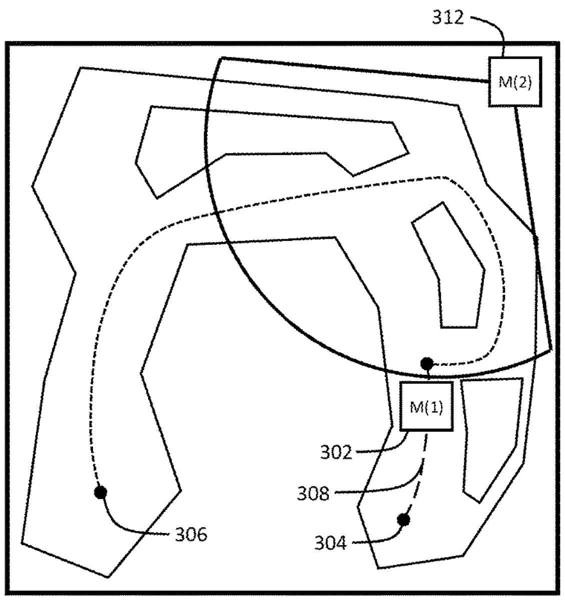
FIG. 3C illustrates an overhead view of an altered path plan for a first machine between an origin location and a destination that encounters an unresolved obstacle based on capabilities provided by a second machine, in accordance with an embodiment of the present invention.

FIG. 3C illustrates an overhead view of an altered path plan for a first machine between an origin location and a destination that encounters an unresolved obstacle based on capabilities provided by a second machine, in accordance with an embodiment of the present invention. In this example, machine to machine capability sharing program 200 determines a solution to the encountered issue includes extending a visual range of the machine 302. Machine to machine capability sharing program 200 determines the visual range of machine 302 is extendable with aerial machine 312 via a sharable capability that includes a camera stream with field of view 314 of the area surrounding machine 302 from an elevated position. Machine to machine capability sharing program 200 provide, by aerial machine 312, the camera stream to machine 302 of the surrounding area. Machine to machine capability sharing program 200 on machine 302 utilizes the camera stream from aerial machine 312 to alter planned path 308 to take modified path 316 around terrain feature 318. Terrain feature 318 previously blocked the visual range of machine 302, therefore machine 302 could not identify modified path 316 when traveling between origin location 304 and destination location 306.

Figure 4A:
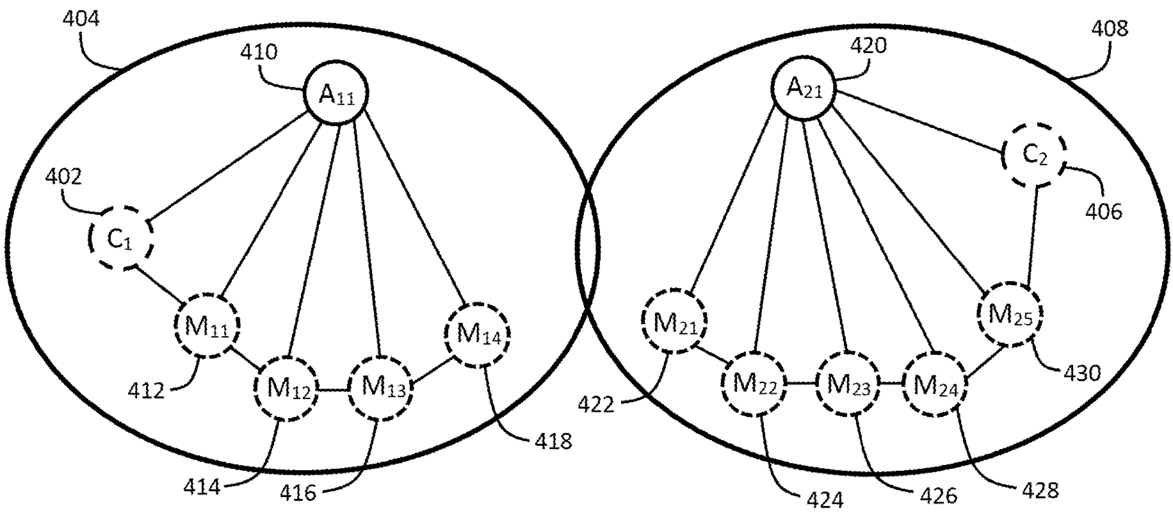
FIG. 4A illustrates two spheres of influence with two respective controllers and two respective teams of machines, in accordance with an embodiment of the present invention.

FIG. 4A illustrates two spheres of influence with two respective controllers and two respective teams of machines, in accordance with an embodiment of the present invention. In this example, first controller 402 represents a first management hub for establishing first sphere of influence 404 and second controller 406 represents a second management hub for establishing second sphere of influence 408. Machine to machine capability sharing program 200 sends machine information to first controller 402 from aerial device 410 and land machine 412, 414, 416, and 418, where first controller 402 registers the devices to form a first team under the first sphere of influence 404. Machine to machine capability sharing program 200 sends machine information to second controller 406 from aerial device 420 and land machine 422, 424, 426, 428, and 430, where second controller 406 registers the devices to form a second team under the second sphere of influence 408.

Figure 4B:
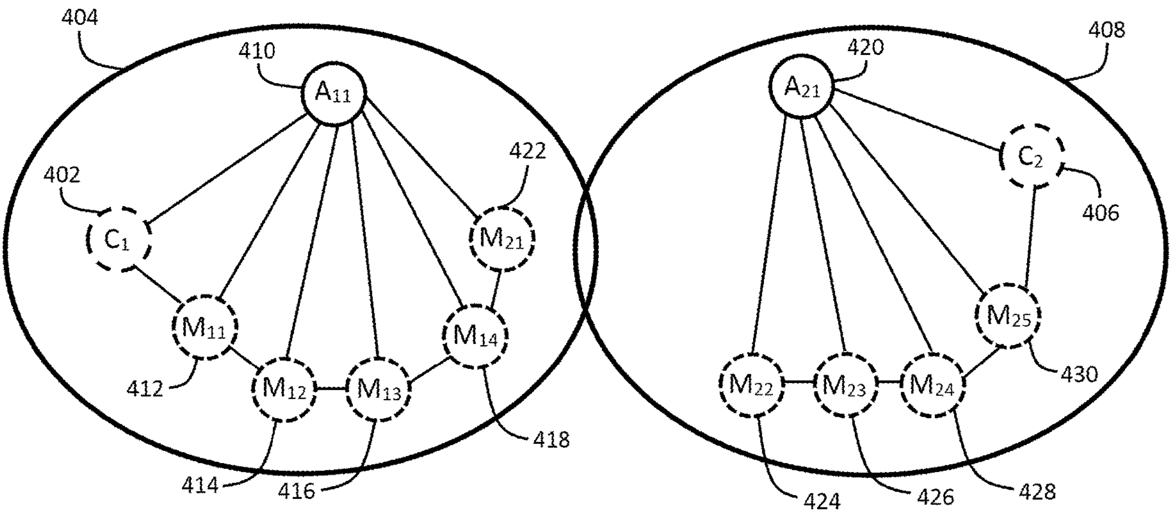
FIG. 4B illustrates a first machine that has transition between a first sphere of influence with a first controller to a second sphere of influence with a second controller, in accordance with an embodiment of the present invention.

FIG. 4B illustrates a first machine that has transition between a first sphere of influence with a first controller to a second sphere of influence with a second controller, in accordance with an embodiment of the present invention. In this example, machine to machine capability sharing program 200 determines land machine 418 has encountered an issue while performing an assigned task, where land machine 418 requires a specific type of sensor that is currently inoperable on land machine 418. Machine to machine capability sharing program 200 further determines a solution to the encountered issue, where another land machine can temporarily provide data from a sensor similar to the specific type of sensor that is currently inoperable on land machine 418. Machine to machine capability sharing program 200 determines that the first sphere of influence with first controller 402 does include an aerial device or a land machine with the sensor that can produce the required date. However, the second sphere of influence 408 includes land machine 422 that can provide the required from the sensor that is currently inoperable on land machine 418. Machine to machine capability sharing program 200 can query land machine 422 to temporarily utilize the sensor similar to the specific type of sensor that is currently inoperable on land machine 418 and upon approval from machine 422, land machine 412 is transferred from the second sphere of influence 408 with second controller 406 to the first sphere of influence 404 with controller 402.

Figure 5A:
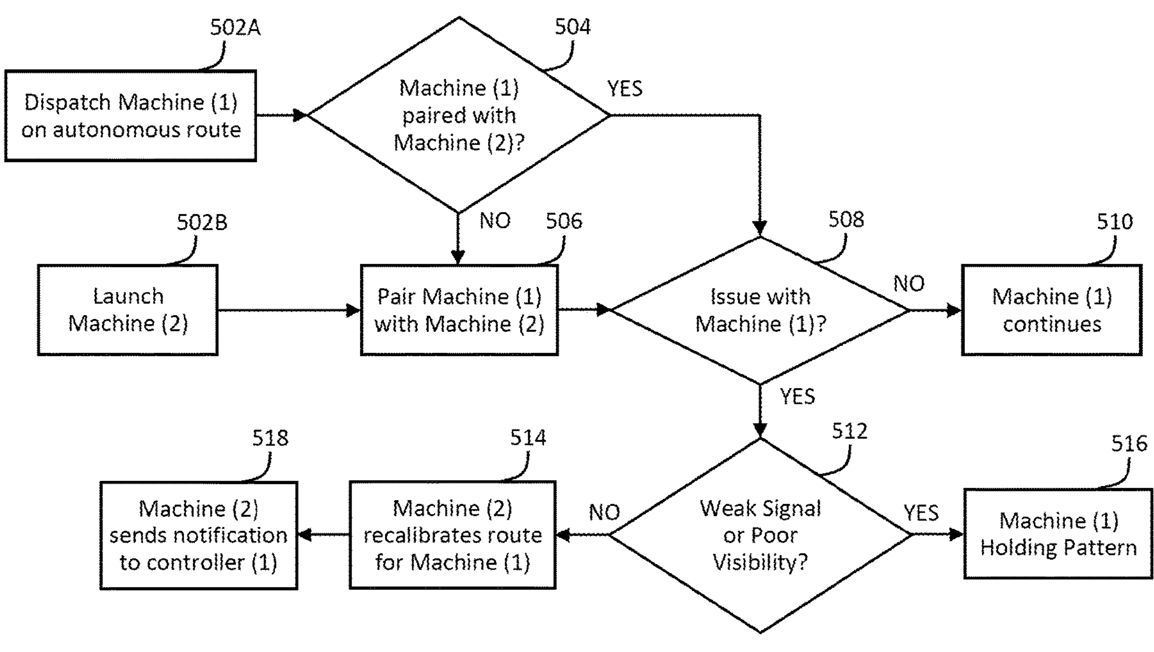
FIG. 5A illustrates a process flow for a deployed team that includes an autonomous aerial machine and multiple autonomous ground machines with a single controller, in accordance with an embodiment of the present invention.

FIG. 5A illustrates a process flow for a deployed team that includes an autonomous aerial machine and multiple autonomous ground machines with a single controller, in accordance with an embodiment of the present invention. In this example, machine to machine capability sharing program 200 deploys the team to an area to perform a task, where machine 1 represents a land based machine and machine 2 represents an aerial based machine. Machine to machine capability sharing program 200 dispatches machine 1 on an autonomous route (502A) and launches machine 2 (502B). Machine to machine capability sharing program 200 determines if machine 1 is paired with machine 2 (504). If machine to machine capability sharing program 200 determines machine 1 was not paired to machine 2 via a M2M communication mesh, machine to machine capability sharing program 200 pairs machine 1 with machine 2 via the M2M communication mesh (506). If machine to machine capability sharing program 200 determines machine 1 was paired to machine 2 via the M2M communication mesh, machine to machine capability sharing program 200 monitors machine 1 and determines whether machine 1 has encountered an issue (508).

If machine to machine capability sharing program 200 determines that machine 1 has not encountered an issue, machine 1 continues on the route (510). If machine to machine capability sharing program 200 determines that machine 1 has encountered an issue, machine to machine capability sharing program 200 determines whether there is a weak signal or poor visibility between machine 1 and machine 2 (512). If machine to machine capability sharing program 200 determines there is no weak signal or poor visibility between machine 1 and machine 2, machine to machine capability sharing program 200 instructs machine 2 to recalibrate the route for machine 1 (514). If machine to machine capability sharing program 200 determines there is a weak signal or poor visibility between machine 1 and machine 2, machine to machine capability sharing program 200 instructs machine 1 to enter a holding pattern (516) until the signal or visibility between machine 1 and machine 2 can be restored. Subsequent to machine to machine capability sharing program 200 instructing machine 2 to recalibrate the route for machine 1, machine to machine capability sharing program 200 sends, via machine 2, a notification to the first controller (i.e., a first management hub) regarding the recalibrated route for machine 1 (518).

Figure 5B:
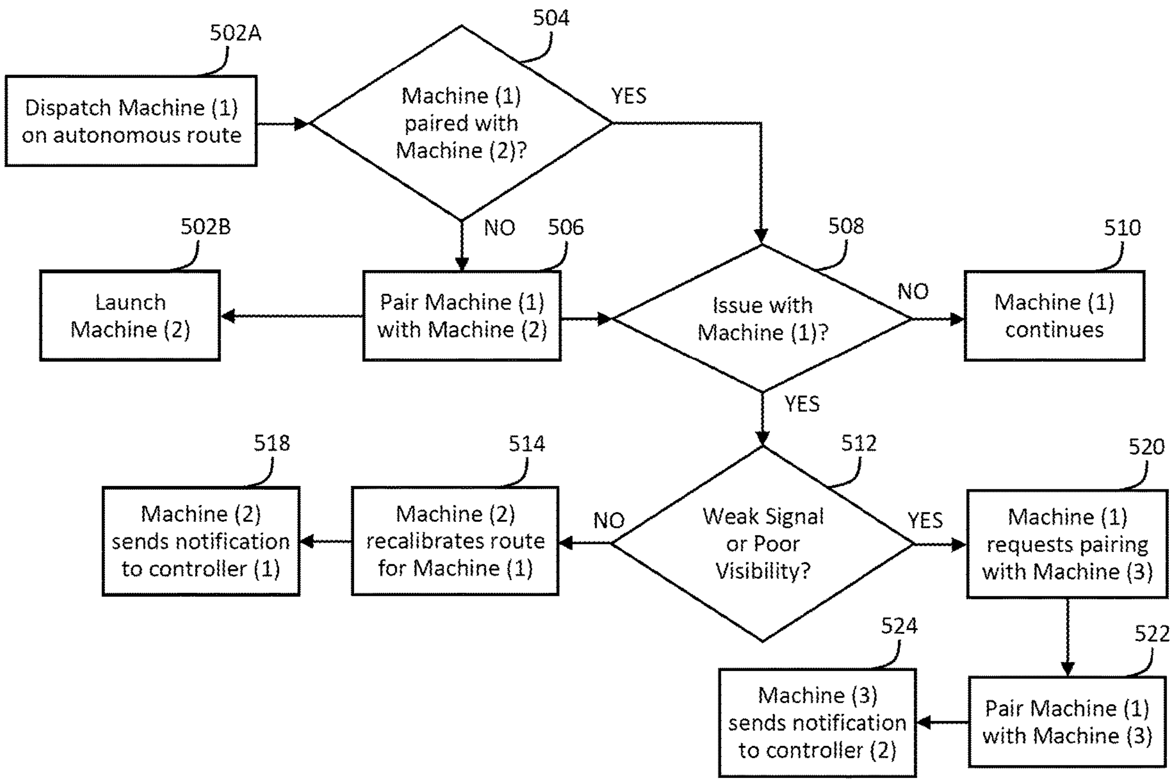
FIG. 5B illustrates a process flow for multiple deployed teams that includes multiple autonomous aerial machines and multiple autonomous ground machines with multiple controllers, in accordance with an embodiment of the present invention.

FIG. 5B illustrates a process flow for multiple deployed teams that includes multiple autonomous aerial machines and multiple autonomous ground machines with multiple controllers, in accordance with an embodiment of the present invention. In this example, rather than machine to machine capability sharing program 200 instructing machine 1 to enter a holding pattern as previously described with regards to FIG. 5A, machine to machine capability sharing program 200 request machine 1 pair with machine 3 (520), where machine 3 is associated with a second controller (i.e., a second management hub). Machine to machine capability sharing program 200 pairs machine 1 with machine 3 utilizing the M2M communication mesh (522) and machine to machine capability sharing program 200 sends, via machine 3, a notification to the second controller (i.e., a first management hub) regarding the recalibrated route for machine 1 (524).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

determining a first machine out of a plurality of machines has encountered an issue, that cannot be resolved, wherein the plurality of machines are connected via a machine to machine communication mesh;

determining a first solution to the issue encountered by the first machine while performing an assigned task;

determining, based on a plurality of structured messages provided by a management hub, a second machine from the plurality of machines can provide the first solution to the issue encountered by the first machine; and providing, to the first machine, a first sharable capability of the second machine to resolve the issue encountered by the first machine, wherein the providing includes:

instructing the second machine to relocate within a predefined radius surrounding the first machine; and sending, by the second machine, sensory data from a first sensor on the second machine to the first machine for a predetermined amount of time, wherein the first sensor matches a sensor type of a faulty sensor on the first machine.

2. The method of claim 1, further comprising:

sending, to the management hub, machine information for each machine from the plurality of machines, wherein the machine information includes device node properties;

receiving, from the management hub, team information for the plurality of machines to perform the assigned task, wherein the team information provides sharable capabilities for each machine from the plurality of machines;

receiving, from the management hub, instructions to join a team for each machine from the plurality of machines based on the team information; and deploying the team to an area to perform the assigned task.

3. The method of claim 1, further comprising:

identifying a plurality of sharable capabilities for the plurality of machines utilizing node properties for each machine from the plurality of machines, wherein the plurality of sharable capabilities includes the first sharable capability of the second machine.

4. The method of claim 1, further comprising:

providing to a third machine from the plurality of machines the first sharable capability of the second machine, wherein the second machine provides the first sharable capability to the third machine on an alternating basis with the first machine.

5. The method of claim 1, wherein the providing to the first machine the first sharable capability of the second machine further comprises:

performing, by the second machine, a portion of the assigned task in parallel to another portion of the assigned task being performed by the first machine; and integrating a first result from the portion of the assigned task performed by the second machine with a second result from the another portion of the assigned task performed by the first machine.

6. The method of claim 1, wherein the providing to the first machine the first sharable capability of the second machine further comprises:

instructing the second machine to relocate within the predefined radius surrounding the first machine; and sending, by the second machine, camera imagery to the first machine, wherein the camera imagery from the second machine extends a visual range of the first machine to resolve the issue encountered of an obstacle between an origin location and a destination location.

7. A computer program product comprising:

one or more computer readable storage media; and program instructions stored on the one or more computer readable storage media to perform operations comprising:

determining a first machine out of a plurality of machines has encountered an issue, that cannot be resolved, wherein the plurality of machines are connected via a machine to machine communication mesh;

determining a first solution to the issue encountered by the first machine while performing an assigned task;

determining, based on a plurality of structured messages provided by a management hub, a second machine from the plurality of machines can provide the first solution to the issue encountered by the first machine; and providing, to the first machine, a first sharable capability of the second machine to resolve the issue encountered by the first machine, wherein the providing includes:

instructing the second machine to relocate within a predefined radius surrounding the first machine; and sending, by the second machine, sensory data from a first sensor on the second machine to the first machine for a predetermined amount of time, wherein the first sensor matches a sensor type of a faulty sensor on the first machine.

8. The computer program product of claim 7, wherein the operations further comprise:

sending, to the management hub, machine information for each machine from the plurality of machines, wherein the machine information includes device node properties;

receiving, from the management hub, team information for the plurality of machines to perform the assigned task, wherein the team information provides sharable capabilities for each machine from the plurality of machines;

receiving, from the management hub, instructions to join a team for each machine from the plurality of machines based on the team information; and deploying the team to an area to perform the assigned task.

9. The computer program product of claim 7, wherein the operations further comprise:

identifying a plurality of sharable capabilities for the plurality of machines utilizing node properties for each machine from the plurality of machines, wherein the plurality of sharable capabilities includes the first sharable capability of the second machine.

10. The computer program product of claim 7, further comprising:

providing to a third machine from the plurality of machines the first sharable capability of the second machine, wherein the second machine provides the first sharable capability to the third machine on an alternating basis with the first machine.

11. The computer program product of claim 7, wherein the providing to the first machine the first sharable capability of the second machine comprises:

performing, by the second machine, a portion of the assigned task in parallel to another portion of the assigned task being performed by the first machine; and integrating a first result from the portion of the assigned task performed by the second machine with a second result from the another portion of the assigned task performed by the first machine.

12. The computer program product of claim 7, wherein the providing to the first machine the first sharable capability of the second machine comprises:

instructing the second machine to relocate within the predefined radius surrounding the first machine; and sending, by the second machine, camera imagery to the first machine, wherein the camera imagery from the second machine extends a visual range of the first machine to resolve the issue encountered of an obstacle between an origin location and a destination location.

13. A computer system comprising:

a processor set;

one or more computer readable storage media; and program instructions stored on the one or more computer readable storage media to cause the processor set to perform operations comprising:

determining a first machine out of a plurality of machines has encountered an issue, that cannot be resolved, wherein the plurality of machines are connected via a machine to machine communication mesh;

determining a first solution to the issue encountered by the first machine while performing an assigned task;

determining, based on a plurality of structured messages provided by a management hub, a second machine from the plurality of machines can provide the first solution to the issue encountered by the first machine; and providing, to the first machine, a first sharable capability of the second machine to resolve the issue encountered by the first machine, wherein the providing includes:

instructing the second machine to relocate within a predefined radius surrounding the first machine; and sending, by the second machine, sensory data from a first sensor on the second machine to the first machine for a predetermined amount of time, wherein the first sensor matches a sensor type of a faulty sensor on the first machine.

14. The computer system of claim 13, wherein the operations further comprise:

sending, to the management hub, machine information for each machine from the plurality of machines, wherein the machine information includes device node properties;

receiving, from the management hub, team information for the plurality of machines to perform the assigned task, wherein the team information provides sharable capabilities for each machine from the plurality of machines;

receiving, from the management hub, instructions to join a team for each machine from the plurality of machines based on the team information; and deploying the team to an area to perform the assigned task.

15. The computer system of claim 13, wherein the operations further comprise:

identifying a plurality of sharable capabilities for the plurality of machines utilizing node properties for each machine from the plurality of machines, wherein the plurality of sharable capabilities includes the first sharable capability of the second machine.

16. The computer system of claim 13, wherein the operations further comprise:

providing to a third machine from the plurality of machines the first sharable capability of the second machine, wherein the second machine provides the first sharable capability to the third machine on an alternating basis with the first machine.

17. The computer system of claim 13, wherein the providing to the first machine the first sharable capability of the second machine comprises:

performing, by the second machine, a portion of the assigned task in parallel to another portion of the assigned task being performed by the first machine; and integrating a first result from the portion of the assigned task performed by the second machine with a second result from the another portion of the assigned task performed by the first machine.

18. The computer system of claim 13, wherein the providing to the first machine the first sharable capability of the second machine comprises:

instructing the second machine to relocate within the predefined radius surrounding the first machine; and sending, by the second machine, camera imagery to the first machine, wherein the camera imagery from the second machine extends a visual range of the first machine to resolve the issue encountered of an obstacle between an origin location and a destination location.

* * * * *